United States Patent
Roberts et al.

(10) Patent No.: US 7,437,889 B2
(45) Date of Patent: Oct. 21, 2008

(54) METHOD AND APPARATUS FOR PRODUCING PRODUCTS FROM NATURAL GAS INCLUDING HELIUM AND LIQUEFIED NATURAL GAS

(75) Inventors: Mark Julian Roberts, Kempton, PA (US); John Michael Repasky, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 344 days.

(21) Appl. No.: 11/329,511

(22) Filed: Jan. 11, 2006

(65) Prior Publication Data

US 2007/0157662 A1 Jul. 12, 2007

(51) Int. Cl.
*F25J 3/00* (2006.01)
*F25J 1/00* (2006.01)

(52) U.S. Cl. ............................ 62/619; 62/639; 62/613

(58) Field of Classification Search ............... 62/613, 62/619, 639
See application file for complete search history.

(56) References Cited

U.S. PATENT DOCUMENTS

| | | | | |
|---|---|---|---|---|
| 1,881,116 A | * | 10/1932 | Bottoms | .................. 62/639 |
| 3,205,669 A | | 9/1965 | Grossmann | |
| 3,407,614 A | * | 10/1968 | Poska | .......................... 62/639 |
| 3,653,220 A | * | 4/1972 | Foster et al. | ................... 62/639 |
| 4,238,211 A | * | 12/1980 | Stuart | .......................... 62/639 |
| 4,701,201 A | * | 10/1987 | Hanson et al. | ................. 62/639 |
| 4,758,258 A | | 7/1988 | Mitchell et al. | |
| 5,771,714 A | * | 6/1998 | Emley et al. | .................. 62/639 |
| 6,105,391 A | | 8/2000 | Capron | |
| 6,743,829 B2 | | 6/2004 | Fischer-Calderon et al. | |
| 7,201,019 B2 | * | 4/2007 | Howard | ....................... 62/617 |
| 2003/0136146 A1 | | 7/2003 | Fischer-Calderon | |
| 2004/0248999 A1 | * | 12/2004 | Briscoe et al. | .............. 518/703 |

FOREIGN PATENT DOCUMENTS

| | | |
|---|---|---|
| EP | 1306632 | 5/2003 |
| GB | 2357140 | 6/2001 |
| WO | 2006/009646 A | 1/2006 |

* cited by examiner

*Primary Examiner*—William C Doerrler
(74) *Attorney, Agent, or Firm*—Willard Jones, II (57) ABSTRACT

The present invention relates to a process and apparatus for producing crude helium, liquefied natural gas product, and synthesis gas from natural gas. A natural gas comprising helium and methane is cooled to produce cooled natural gas. At least a portion of the helium and methane from the cooled natural gas is separated into a vapor comprising helium, from which crude helium is derived, and a liquid comprising methane. At least a portion of the methane from this liquid is separated into a vapor, which is reacted to produce synthesis gas, and a liquid, from which liquefied natural gas is derived. Additional heat exchange and separation steps may be included.

18 Claims, 6 Drawing Sheets

METHOD AND APPARATUS FOR PRODUCING PRODUCTS FROM NATURAL GAS INCLUDING HELIUM AND LIQUEFIED NATURAL GAS

BACKGROUND OF THE INVENTION

This invention relates to a process for cost-effectively producing commercial products from natural gas. More particularly, this invention relates to a combined process for producing a liquefied natural gas (LNG) product, a crude helium, and a synthesis gas.

Natural gas generally refers to rarefied or gaseous hydrocarbons found in the earth. Non-combustible natural gases occurring in the earth, such as carbon dioxide, helium and nitrogen are generally referred to by their proper chemical names. Often, however, non-combustible gases are found in combination with combustible gases and the mixture is referred to generally as "natural gas" without any attempt to distinguish between combustible and non-combustible gases.

Natural gas is often plentiful in regions where it is uneconomical to develop those reserves due to lack of a local market for the gas or the high cost of processing and transporting the gas to distant markets.

It is common practice to cryogenically liquefy natural gas so as to produce liquefied natural gas (LNG) for storage and transport. A fundamental reason for the liquefaction of natural gas is that liquefaction results in a volume reduction of about 1/600, thereby making it possible to store and transport the liquefied gas in containers at low or even atmospheric pressure. Liquefaction of natural gas is of even greater importance in enabling the transport of gas from a supply source to market where the source and market are separated by great distances and pipeline transport is not practical nor economically feasible.

In order to store and transport natural gas in the liquid state, the natural gas is preferably cooled to −240° F. (−151° C.) to −260° F. (−162° C.) where it may exist as a liquid at near atmospheric vapor pressure. Various systems exist in the prior art for liquefying natural gas or the like whereby the gas is liquefied by sequentially passing the gas at an elevated pressure through a plurality of cooling stages, cooling the gas to successively lower temperatures until liquefaction is achieved. Cooling is generally accomplished by heat exchange with one or more refrigerants such as propane, propylene, ethane, ethylene, nitrogen, and methane, or mixtures thereof. The refrigerants are commonly arranged in a cascaded manner, in order of diminishing refrigerant boiling point.

Additionally, chilled, pressurized natural gas can be expanded to atmospheric pressure by passing the natural gas through one or more expansion stages. During the course of this expansion to atmospheric pressure, the gas is further cooled to a suitable storage or transport temperature by flash vaporizing at least a portion of the already liquefied natural gas. The flashed vapors from the expansion stages are generally collected and recycled for liquefaction or burned to generate power for the LNG manufacturing facility.

LNG projects have not always been economical in that cryogenic refrigeration systems are highly energy intensive and require a substantial capital investment. In addition, participating in the LNG business requires further investment for sophisticated and costly shipping vessels and regasification systems so that the LNG consumer can process the product.

An alternative to the cryogenic liquefaction of natural gas to LNG is the chemical conversion of natural gas into products, for example Gas-To-Liquid (GTL) products via the production of synthesis gas (syngas). Synthesis gas is herein defined as a gas comprising hydrogen and carbon dioxide. A synthesis gas generator is herein defined as any device that produces synthesis gas as an intermediate or final product.

Traditional GTL products include, but are not limited to, methanol, acetic acid, olefins, dimethyl ether, dimethoxy methane, polydimethoxy methane, urea, ammonia, fertilizer, Fischer Tropsch reaction products, and hydrogen. The Fischer Tropsch reaction produces mostly paraffinic products of varying carbon chain length, useful for producing lower boiling alkanes, naphtha, distillates useful as jet and diesel fuel and furnace oil, and lubricating oil and wax base stocks.

The most common commercial methods for producing synthesis gas are steam-methane reforming, auto-thermal reforming, gas heated reforming, partial oxidation, and combinations thereof. Emerging technologies include catalytic partial oxidation and ion transport membrane (ITM) processes.

Steam methane reforming generally reacts steam and natural gas at high temperatures and moderate pressures over a reduced nickel-containing catalyst to produce synthesis gas.

Autothermal reforming generally processes steam, natural gas and oxygen through a specialized burner where only a portion of the methane from the natural gas is combusted. Partial combustion of the natural gas provides the heat necessary to conduct the reforming reactions that will occur over a catalyst bed located in proximity to the burner.

Gas heated reforming consists of two reactors or reaction zones, a gas heated reformer reactor/zone and an autothermal reformer reactor/zone. In one configuration, steam and natural gas are fed to the gas-heated reformer where a portion of the natural gas reacts, over catalyst, to form synthesis gas. This mixture of unreacted natural gas and synthesis gas is then fed to the autothermal reformer, along with oxygen, where the remaining natural gas is converted to synthesis gas. The hot synthesis gas stream exiting the autothermal reformer is then routed back to the gas reformer to provide the heat of reaction necessary for the gas-heated reformer.

Partial oxidation reforming generally processes natural gas, oxygen, and optionally steam through a specialized burner where a substantial portion of the methane is combusted at high temperatures to produce synthesis gas. In contrast to autothermal reforming, no catalyst is present in the partial oxidation reactor.

Current technology for manufacturing synthesis gas is highly capital intensive. Autothermal and partial oxidative synthesis gas methods generally require a costly air separation plant to produce oxygen. Steam reforming, which does not require oxygen manufacture, produces a synthesis gas having a higher hydrogen to carbon monoxide ratio that is less than stoichiometrically optimum for manufacture of Fischer Tropsch products. Additionally, the market for GTL products such as dimethyl ether and Fischer Tropsch products has been erratic or in some cases, insufficiently established to overcome the substantial capital investment risk inherent in erecting such plants.

Natural gas reserve holders have found that substantially increasing the capacity of a LNG or GTL plant can improve plant construction economics. Many of the costs inherent to building such plants are fixed or minimally, do not increase linearly with capacity. However, it has also been found that as more of a single product is produced in a distinct and often isolated geographical region, the product price over cost margin is reduced.

Helium is increasingly in demand for several applications, e.g. as a shielding gas during welding and in the chemical industry, coolant for MRI magnets, as a quenching gas in metals processing, as inert gas in space technology, as a respiration gas during diving, as a carrier gas in chromatography, for the detection of leakages, as a balloon-filling gas and for other purposes as well. For these purposes, high purity helium may be required. In order to achieve high purity helium from gas mixtures containing only low levels of helium, several processing steps may be required. The gas mixture may be processed to form a crude helium gas mixture and subsequently purified to form a high purity helium stream from this crude helium gas mixture.

Helium is enriched and recovered mainly from helium-containing natural gases. The main components of these natural gases are nitrogen and methane, as well as up to 10% helium by volume, besides lower proportions of several higher-molecular weight hydrocarbons and carbon dioxide.

Helium typically occurs in very low concentrations in certain natural gas fields. Natural gas streams from which helium can be economically recovered typically contain at least approximately 0.1 volume % to 0.5 volume % helium. This helium may be upgraded to produce a crude helium containing typically at least 20 volume % helium. Crude helium is defined herein to be a fluid containing greater than 20 volume % helium.

Methods of helium enrichment are known.

The helium-containing natural gas is cooled down to approximately −150° C. in a cryogenic plant, whereby primarily the hydrocarbons will be separated out by condensation. The so-produced gas mixture, except for low proportions of other gases may contain more than 50% by volume helium and nitrogen. Such crude helium can be treated on site to give a helium of very high purity, e.g. by subjecting it to some process combination comprising a pressure swing adsorption plant and a second cryogenation unit.

Another alternative is to sell the crude helium as an intermediate product to be treated by a third party.

The present invention is useful for recovering helium from natural gas reserves. It would be desirable to effectively combine crude helium, LNG, and synthesis gas production. It would be desirable to recover helium from natural gas reserves where the helium concentration is less than 0.1 volume %. Heretofore, helium recovery from low helium concentration natural gas reserves was considered not viable.

The current invention satisfies the growing need for helium for industrial processes and growing need for fossil fuel energy, especially clean burning fuels.

BRIEF SUMMARY OF THE INVENTION

The present invention relates to a process and apparatus for producing products from natural gas including crude helium, liquefied natural gas, and synthesis gas.

According to the inventive process, a natural gas comprising helium and methane is cooled to produce cooled natural gas. At least a portion of the helium and methane from the cooled natural gas is separated into a vapor comprising helium, from which crude helium is derived, and a liquid comprising methane. At least a portion the methane from this liquid is separated into a vapor comprising methane, which is reacted to produce synthesis gas, and a liquid, from which liquefied natural gas is derived. Additional heat exchange and separation steps may be included.

The inventive apparatus includes a first heat exchanger for at least partially liquefying natural gas. The heat exchanger has an outlet fluidly connected to an inlet of a first separation device. The first separation device has a liquid outlet fluidly connected to an inlet of a second separation device and a vapor outlet fluidly connected to an inlet of a second heat exchanger. The second separation device has a liquid outlet fluidly connected to an inlet of a liquefied natural gas storage vessel and a vapor outlet. The second heat exchanger has an outlet fluidly connected to an inlet of a third separation device. The third separation device has a vapor outlet for discharging crude helium and a liquid outlet. At least one of the liquid outlet of the third separation device and the vapor outlet of the second separation device is fluidly connected to a synthesis gas generator. Optionally, the vapor outlet for discharging crude helium is connected to an inlet of a helium purifying device.

DETAILED DESCRIPTION OF THE INVENTION

The present invention is directed to a process and apparatus for producing liquefied natural gas product, crude helium, and synthesis gas from natural gas. The natural gas contemplated herein comprises helium and at least 50 mole percent methane, and may comprise at least 75 mole percent methane, and may comprise at least 90 mole percent methane for best results. The concentration of helium may be less than 0.5 volume % or may be less than 0.1% or may be less than 0.05%. The balance of natural gas may comprise other combustible hydrocarbon such as, but not limited to, ethane, propane, butane, pentane, and heavier hydrocarbons and non-combustible components such as carbon dioxide, hydrogen sulfide, water, and nitrogen.

The natural gas may be pretreated at a natural gas plant for removal of water, carbon dioxide, mercury, and/or hydrogen sulfide. Natural gas liquids (NGL's) may also be separated and removed as a separate product. NGL's generally include alkanes present in natural gas having two or more carbon atoms.

The present invention may provide a substantial reduction in the specific energy consumption for liquefied natural gas production. After liquefaction at high pressure, the liquefied natural gas is further cooled and the pressure reduced down to atmospheric pressure by flash vaporizing a portion of the liquefied natural gas. The temperature of the liquefied natural gas prior to the flash vaporization affects the amount of vapor generated. A lower temperature results in less vapor. When only liquefied natural gas product is needed, the amount of flash vapor produced is generally targeted to meet fuel requirements for the liquefied natural gas manufacturing facility. Excess flash vapor results in reduced efficiency of the process. For the invention that includes the production of liquefied natural gas, crude helium, and synthesis gas, more flash vapor may be required. The temperature of the liquefied natural gas prior to flash vaporization may be higher than for the case of not producing synthesis gas. This means that less refrigeration, and consequently less power, is needed to cool the feed to the combined process. The power reduction can lead to reduction in the capital investment required to produce liquefied natural gas at a given rate, or can allow increased liquefied natural gas production for a given investment.

Natural gas is generally made available or transported at pressures as high as 19.4 MPa (2800 psig), more commonly at pressures ranging from 0.79 Mpa (100 psig) to 9.75 MPa (1400 psig), and most commonly at pressures ranging from 2.86 MPa (400 psig) to 8.37 MPa (1200 psig). The temperature of the natural gas is dependent on its originating source. Where the natural gas is pipeline gas, its temperature can approximate ambient conditions such as for example, $-17.8°$ C. to 48.9° C. If the natural gas conditions are measured in proximity to a conveyance device such as a natural gas compressor, outlet and post-compression equipment may dictate or affect the temperature and pressure of the natural gas feed.

Pretreatment steps suitable for use with the present invention may begin with steps commonly identified with liquefied natural gas and/or synthesis gas production, including, but not limited to, compressing to elevated pressure, removal of acid gases, mercaptans, mercury and moisture from the natural gas. Acid gases and mercaptans are commonly removed via a sorption process employing an aqueous amine-containing solution or other types of physical or chemical solvents. This step is generally performed upstream of most of the natural gas cooling steps. A substantial portion of the water is generally removed as a liquid through two-phase gas-liquid separation prior to or after low level cooling, followed by molecular sieve processing for removal of trace amounts of water. The water removal steps generally occur upstream of any isenthalpic or isentropic expansion as contemplated herein. Mercury may be removed through use of mercury sorbent beds. Residual amounts of water and acid gases are most commonly removed through the use of particularly selected sorbent beds such as regenerable molecular sieves. Such particularly selected sorbent beds are also generally positioned upstream of most of the natural gas cooling steps.

Subsequent to any optional pretreatment steps, the process of the present invention combines production of crude helium, liquefied natural gas, and synthesis gas product. Referring to FIGS. 1 through 5, natural gas feed 1, which may have a pressure of about 3.45 to 6.20 MPa (500 to 900 psia), is directed to one or more heat exchangers 2 for cooling the natural gas thereby producing a cooled natural gas fluid 7. As used herein, the term "fluid" shall include vapor, liquid, and vapor/liquid mixtures. The natural gas in feed 1 may be pretreated or untreated and may have had NGL's removed. Cooled natural gas fluid 7 may be subcooled liquid, saturated liquid, or a two-phase mixture. Cooled natural gas fluid 7 may have a temperature greater than about $-140°$ C. ($-220°$ F.) or greater than about $-135°$ C. ($-211°$ F.). It was discovered that less subcooling is required for the present invention producing both liquefied natural gas and synthesis gas compared to a process producing liquefied natural gas and not producing synthesis gas, thereby providing power savings. Heat exchanger(s) 2 may be a liquefied natural gas heat exchanger such as those sold in the industry by Air Products and Chemicals, Inc. Cooling may include one or more cooling stages targeted to achieve successively lower natural gas temperatures. Any suitable refrigerant or combination of refrigerants may be employed as cooling fluid(s) 3. For example, because of their availability and cost, refrigerants may include ammonia, propane, propylene, ethane, ethylene, methane, nitrogen, and other normally gaseous materials or mixtures thereof which have been compressed and cooled and liquefied. The refrigerant may also be incorporated into an open cycle configuration wherein there is intimate contact between the refrigerant and the process stream. To the extent that more than one refrigerant fluid is used in the one or more heat exchangers 2, the refrigerant utilized in the later portion of the one or more heat exchangers 2 will generally have a boiling point lower than the refrigerant utilized in the earlier stages of the one or more heat exchangers 2. In an embodiment, propane is utilized as a first refrigerant and mixed refrigerant comprising methane, ethane, propane, and nitrogen is utilized as a subsequent refrigerant.

According to the embodiments illustrated in FIGS. 1 through 5, at least a portion of the cooled natural gas fluid 7 is separated into vapor 42 and liquid 19.

Cooled natural gas fluid 7 is expanded across pressure reduction means 9 so as to lower the pressure of the natural gas fluid 7 and autorefrigerate the natural gas to a lower temperature thereby forming multiphase fluid 10 having a nonzero molar ratio of vapor to liquid. The molar ratio of vapor to liquid may be from 0.0001 to 0.04 or may be from 0.001 to 0.03. As known in the art, pressure reduction may be controlled to generate a particular molar ratio of vapor to liquid. Although pressure reduction means 9 is illustrated as a valve, pressure reduction means 9 may be one or more pressure reduction devices known in the art.

Pressure reduction may be at least partially by isenthalpic means. Suitable devices for isenthalpic expansion of natural gas in accordance with the present invention are known in the art and generally include, but are not limited to, manually or automatically actuated throttling devices such as valves, control valves, Joule Thompson valves, venturi devices, and the like.

Pressure reduction may be at least partially by isentropic means. Suitable devices for isentropic expansion of natural gas in accordance with the present invention are known in the art and generally include equipment such as expanders or turbo expanders that extract or derive work from such expansion. While the pressure reduction step is depicted by isenthalpic expansion in the form of a valve for purposes of FIGS. 1 through 5, this depiction shall be construed to comprise one or more pressure reduction devices contemplated above comprising isentropic and/or isenthalpic expansion arranged in parallel or in series.

According to the embodiments illustrated in FIGS. 1 through 5, at least a portion of the multiphase fluid 10 from the pressure reduction step is directed to a separation device 11 for separating the vapor from the liquid. The vapor, which is enriched in helium, is removed as vapor 42 and the liquid, which comprises methane, is removed as liquid 19. At least a portion of crude helium 12 is derived from at least a portion of vapor 42. Hence, crude helium 12 comprises at least a portion of the helium from vapor 42. Crude helium 12 may be optionally further purified in optional helium purifier 70 using any conventional helium purification process known in the art.

Separation device 11 may be a single stage flash drum or may include multiple theoretical stages of separation for providing better component separation between the constituents in vapor 42 and liquid 19 in FIGS. 1 through 5. Suitable liquid-gas separation devices for providing multiple theoretical stages of separation may include a distillation tower, which may or may not include a reboiler, a condenser, or reflux.

According to the embodiments illustrated in FIGS. 1, 2, 4, and 5, at least a portion of liquid 19 is separated into vapor 27 and liquid 29.

In embodiments illustrated in FIGS. 1, 2, 4, and 5, liquid 19 may be expanded across pressure reduction means 21 so as to lower the pressure of liquid 19 and autorefrigerate the fluid to a lower temperature, thereby generating multiphase fluid 22.

Although pressure reduction means 21 is illustrated as a valve, pressure reduction means 21 may be one or more pressure reduction devices known in the art as described above for pressure reduction means 9.

According to the embodiments illustrated in FIGS. 1, 2, 4, and 5, at least a portion of the multiphase fluid 22 is directed to a separation device 23 for separating the vapor from the liquid. The vapor, which comprises methane, is removed as vapor 27 and the liquid, which comprises methane, is removed as liquid 29. The separation device 23 may be a single stage flash drum or may include multiple theoretical stages of separation for providing better component separation between the constituents in vapor 27 and liquid 29. Suitable liquid-gas separation devices for providing multiple theoretical stages of separation may include a distillation tower, which may or may not include a reboiler, a condenser, or reflux. In an embodiment of the invention, at least a portion of the synthesis gas generator feedstock 26, which supplies an optional synthesis gas generator 80, is derived from at least a portion of vapor 27. The synthesis gas generator feedstock 26 comprises at least a portion of the methane from vapor 27. Methane in the synthesis gas generator feedstock 26 may be reacted in the synthesis gas generator 80 to form an intermediate or final synthesis gas 81.

Figure 1:
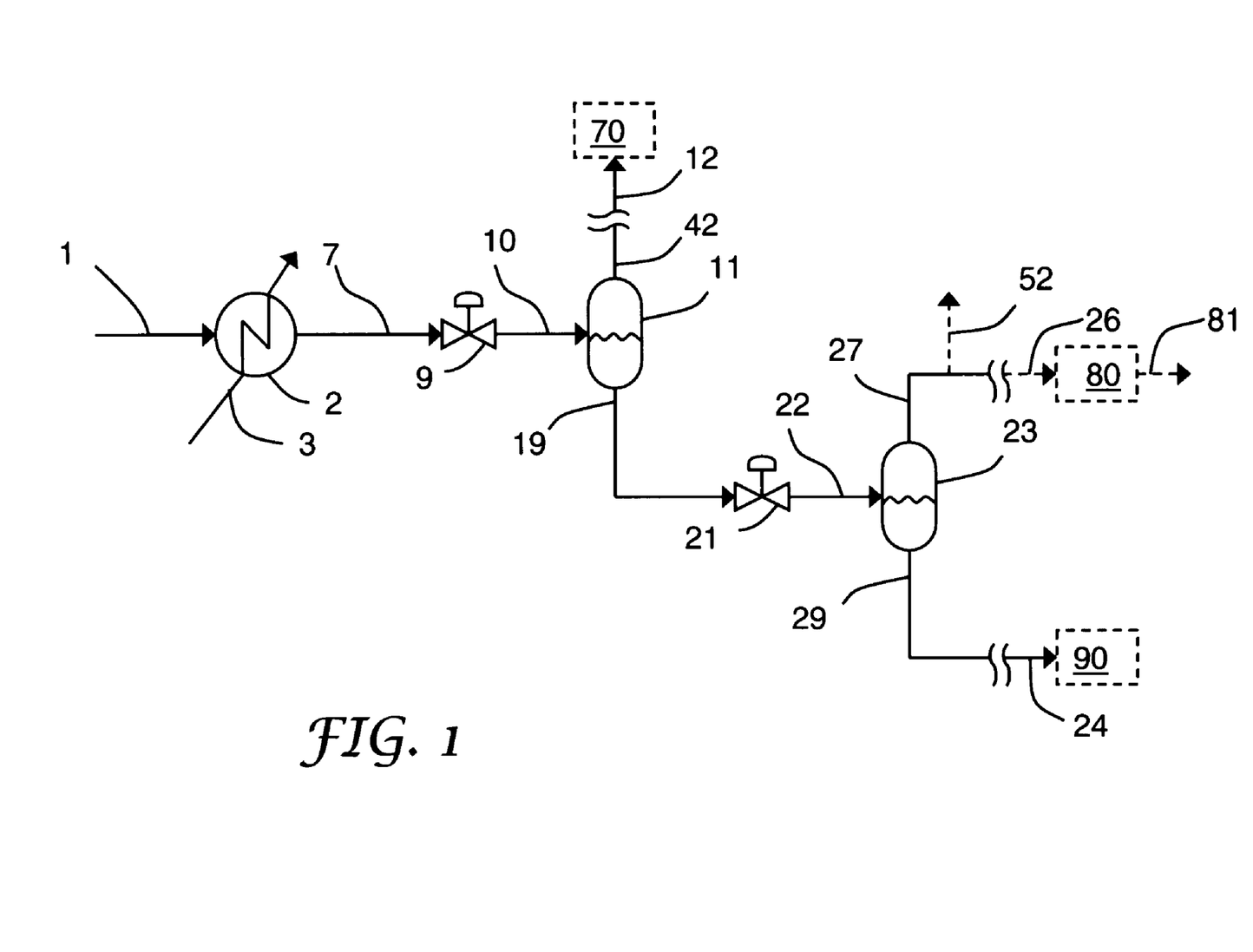
FIG. 1 is a schematic diagram of another embodiment of the present invention for producing products from natural gas.

Optionally, as shown in FIG. 1, fuel 52 may be taken from vapor 27. Fuel 52 may be used for fuel uses in the liquefied natural gas plant or synthesis gas plant such as for gas turbine fuel requirements, steam methane reformer fuel requirements, combined-cycle turbine fuel, or furnace fuel such as for heaters attendant to a hydrocracking facility for processing Fischer Tropsch GTL products. Fuel 52 may also be used for public utility gas, supplying fuel to local cities, towns, or villages.

According to an embodiment of the invention and illustrated in FIG. 1, at least a portion of liquid 19 may be expanded across pressure reduction means 21 thereby reducing the pressure to between 0.10 MPa (14.5 psia) and 0.152 MPa (22 psia), and thereby producing a vapor 27 and a liquid 29. At least a portion of the liquefied natural gas product 24 is derived from at least a portion of liquid 29. Hence, the liquefied natural gas product 24 comprises at least a portion of the methane from liquid 29.

Figure 2:
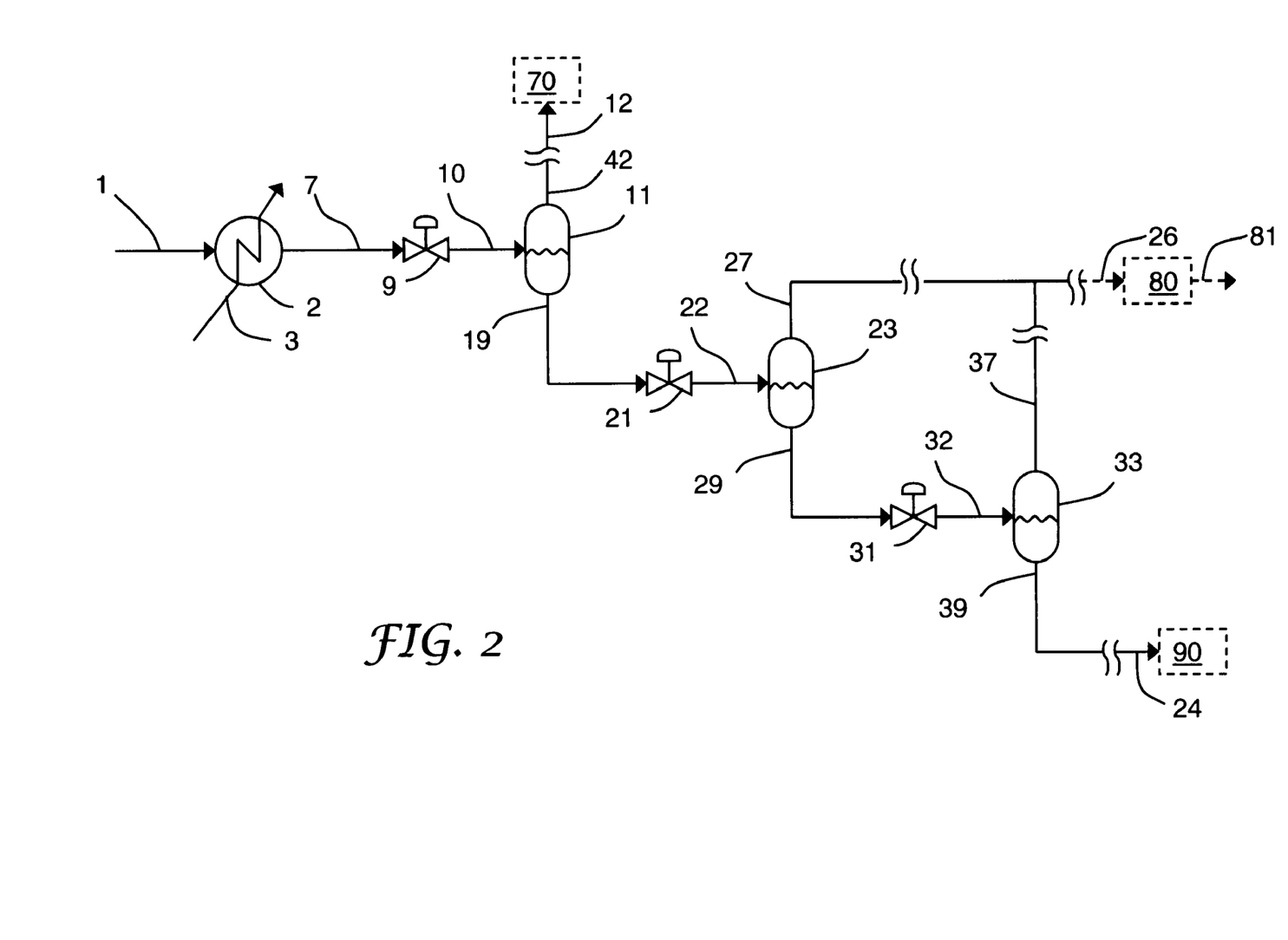
FIG. 2 is a schematic diagram of another embodiment of the present invention for producing products from natural gas.
Figure 4:
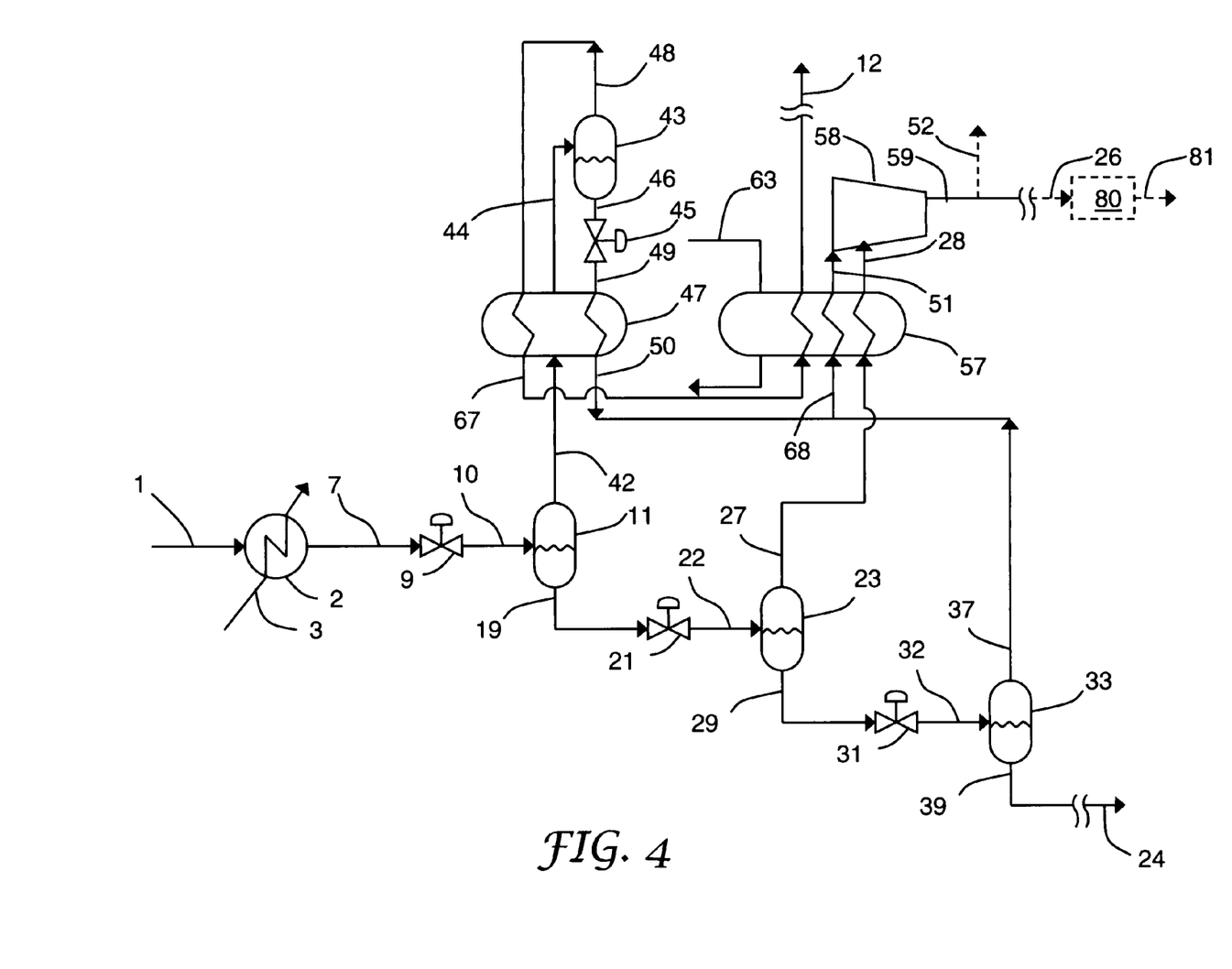
FIG. 4 is a schematic diagram of another embodiment of the present invention for producing products from natural gas.
Figure 5:
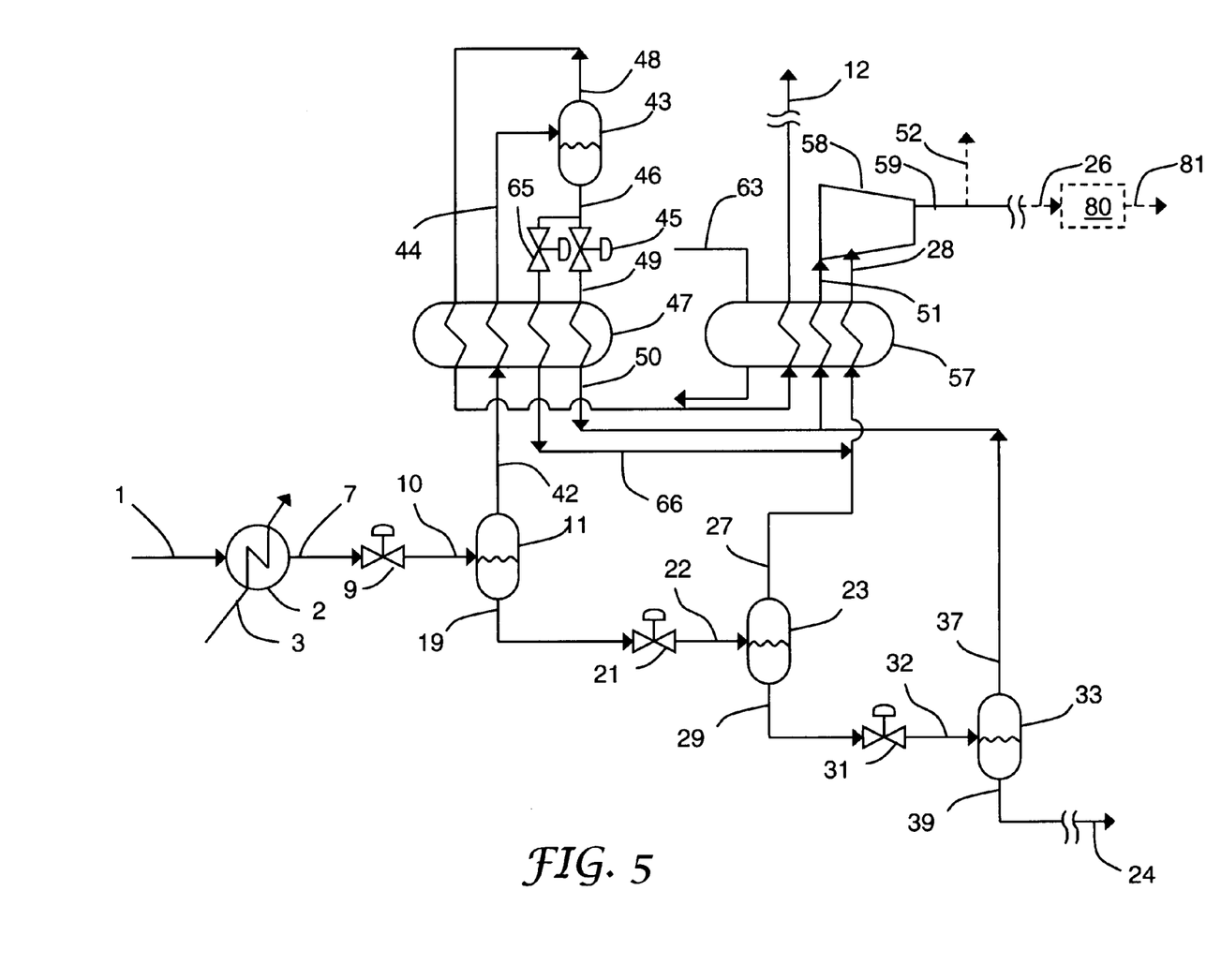
FIG. 5 is a schematic diagram of another embodiment of the present invention for producing products from natural gas.

According to embodiments of the invention and illustrated in FIGS. 2, 4, and 5, at least a portion of liquid 29 is separated into vapor 37 and liquid 39. At least a portion of liquid 29 is expanded across pressure reduction means 31 so as to lower the pressure of liquid 29 and autorefrigerate the fluid to a lower temperature thereby generating multiphase fluid 32. Although pressure reduction means 31 is illustrated as a valve, pressure reduction means 31 may be one or more pressure reduction devices known in the art as described above for pressure reduction means 9. At least a portion of the multiphase fluid 32 is directed to a separation device 33 for separating the vapor from the liquid. The vapor, which comprises methane, is removed as vapor 37 and the liquid, which comprises methane, is removed as liquid 39. The separation device 33 may be a single stage flash drum or may include multiple theoretical stages of separation for providing better component separation between constituents in vapor 37 and liquid 39. Suitable liquid-gas separation devices for providing multiple theoretical stages of separation may include a distillation tower, which may or may not include a reboiler, a condenser, or reflux. According to the invention, at least a portion of synthesis gas generator feedstock 26, which supplies synthesis gas generator 80, is derived from at least a portion of vapor 37 and/or at least a portion of vapor 27. The synthesis gas generator feedstock 26 comprises at least a portion of the methane from vapor 27 and vapor 37. At least a portion of the liquefied natural gas product 24 is derived from at least a portion of liquid 39. Hence, the liquefied natural gas product 24 comprises at least a portion of the methane from liquid 39.

According to embodiments of the invention illustrated in FIGS. 2, 4, and 5, pressure reduction means 21 may reduce the pressure to a pressure that is greater than 0.152 MPa (22 psia) and pressure reduction means 31 may reduce the pressure to a pressure that is less than 0.152 MPa (22 psia).

Figure 3:
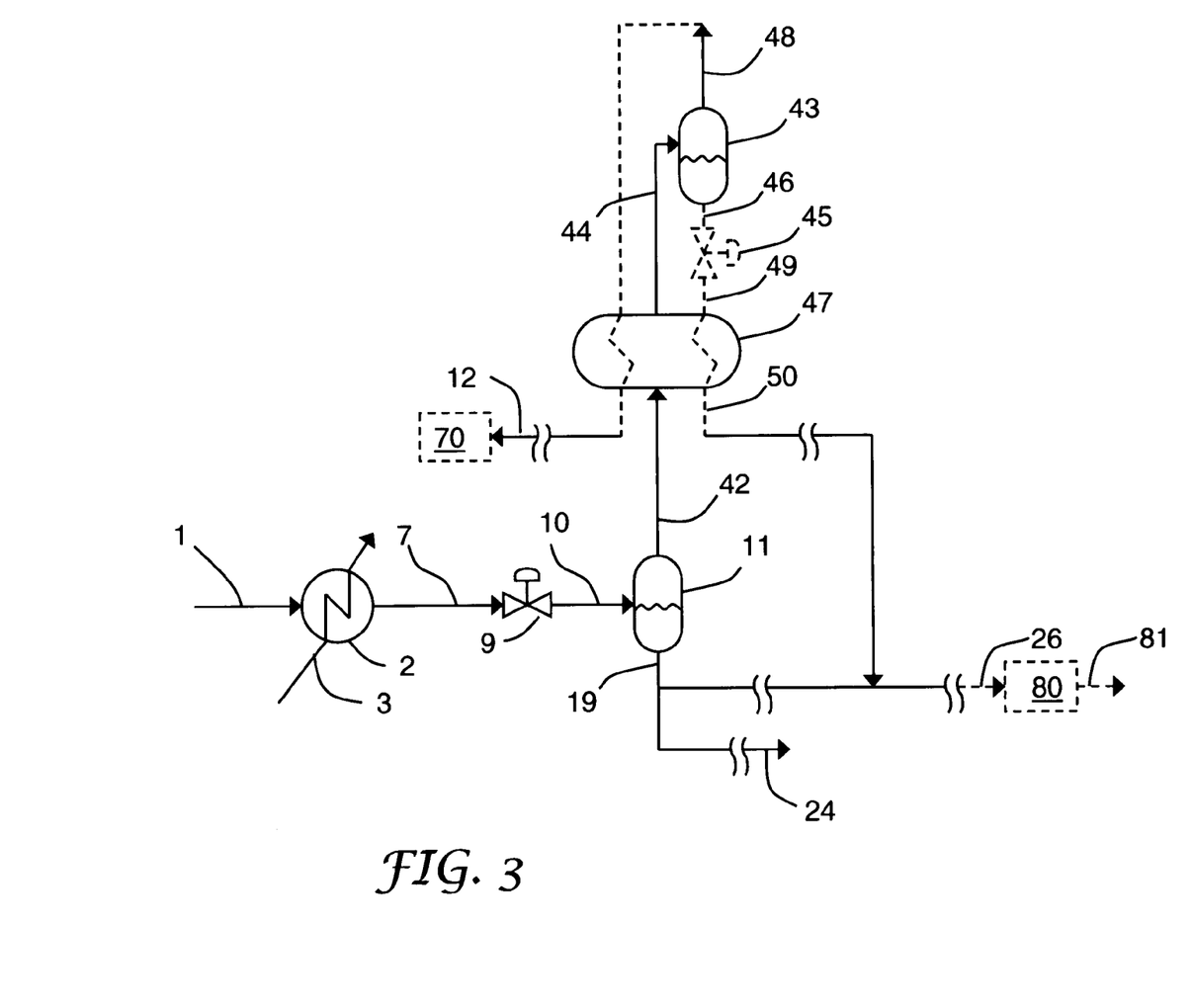
FIG. 3 is a schematic diagram of another embodiment of the present invention for producing products from natural gas.

According to some embodiments of the invention and illustrated in FIGS. 3 through 5, at least a portion of vapor 42 may be cooled in heat exchanger 47 thereby condensing at least a portion of the methane and thereby producing multiphase fluid 44 having a vapor component and a liquid component. At least a portion of the multiphase fluid 44 is directed to a separation device 43 for separating the vapor from the liquid. The vapor, which comprises a higher concentration of helium than the liquid, is removed as the vapor 48 and the liquid, which comprises methane, is removed as liquid 46. The separation device 43 may be a single stage flash drum or may include multiple theoretical stages of separation for providing better component separation between constituents in liquid 46 and vapor 48. Suitable liquid-gas separation devices for providing multiple theoretical stages of separation may include a distillation tower, which may or may not include a reboiler, a condenser, or reflux. At least a portion of crude helium 12 is derived from at least a portion of vapor 48. Crude helium 12 comprises at least a portion of the helium from vapor 48. Crude helium 12 may be further purified by any process known in the art. In these embodiments an option is shown where at least a portion of synthesis gas generator feedstock 26 is derived from at least a portion of liquid 46. Synthesis gas 81 may be formed by reacting least a portion of the methane from liquid 46 after vaporization. Hence, synthesis gas generator feedstock 26 comprises at least a portion of the methane from liquid 46.

As shown in FIGS. 3 through 5, at least a portion of the vapor 48 may be returned to the heat exchanger 47 to be vaporized, thereby providing additional cooling for vapor 42. The heat transfer may be performed in a cocurrent or countercurrent manner with the vapor 48 flowing in a heat transferring relationship to the flow of vapor 42. Suitable devices for performing a heat transfer function include plate, tubular, or other heat transfer elements for transferring heat but not mass as known in the art.

According to some embodiments of the invention and illustrated in FIGS. 3 through 5, at least a portion of the liquid 46 may be expanded across pressure reduction means 45 thereby forming a lower pressure fluid 49 and subsequently returned to heat exchanger 47 to provide cooling for vapor 42. Although pressure reduction means 45 is illustrated as a valve, pressure reduction means 45 may be one or more pressure reduction devices known in the art as described above for pressure reduction means 9. The heat transfer may be performed in a cocurrent or countercurrent manner in a heat transferring relationship to the flow of vapor 42. At least a portion of the resultant heated fluid 50 supplies the synthesis gas generator feedstock 26. At least a portion of the synthesis gas generator feedstock 26 is derived from at least a portion of the heated fluid 50. Hence, synthesis gas generator feedstock 26 comprises at least a portion of the methane from the heated fluid 50. Methane in the synthesis gas generator feedstock 26 may be reacted in the synthesis gas generator 80 to form an intermediate or final synthesis gas 81.

According to an embodiment of the invention and shown in FIG. 4, vapor 27, vapor 48, and fluid 50 may be used to cool refrigerant 63 in one or more heat exchangers 57. Cooling fluid 3 may comprise refrigerant 63. Alternatively, at least a portion of feed 1 may be cooled in heat exchanger(s) 57 in place of refrigerant 63. After passing through heat exchanger 57, resultant vapor 28 and vapor 51 may be compressed in compressor 58 thereby forming compressed gas 59. According to this embodiment, at least a portion of synthesis gas generator feedstock 26, which supplies synthesis gas generator 80, is derived from at least a portion of compressed gas 59. Synthesis gas generator feedstock 26 comprises at least a portion of the methane from compressed gas 59. Optionally, as shown in FIG. 4, fuel 52 may be taken from compressed gas 59.

As shown in an embodiment in FIG. 5, liquid 46 may be expanded across multiple pressure reduction means 45 and 65, and subsequently returned to heat exchanger 47 to provide cooling for vapor 42. Although pressure reduction means 45 and 65 are illustrated as valves, pressure reduction means 45 and 65 may be one or more pressure reduction devices known in the art as described above for pressure reduction means 9. The heat transfer may be performed in a cocurrent or countercurrent manner in a heat transferring relationship to the flow of vapor 42. At least a portion of the resultant heated fluids 50 and 66 may supply the synthesis gas generator feedstock 26. At least a portion of the synthesis gas generator feedstock 26 is derived from at least a portion of fluid 50 and/or at least a portion of fluid 66. Hence the synthesis gas may be formed by reacting at least a portion of the methane from at least one of fluid 50 and fluid 66.

According to an embodiment of the invention and shown in FIG. 56, vapor 27 and fluid 66 may be combined and subsequently used to cool refrigerant 63 in one or more heat exchanger(s) 57. Fluid 50 and vapor 37 may be combined and subsequently used to cool refrigerant 63 in one or more heat exchangers 57. In the embodiment shown in FIG. 5, vapor 48 which comprises helium is used to cool refrigerant 63 in one or more heat exchanger(s) 57. Alternatively, at least a portion of feed 1 may be cooled in heat exchanger(s) 57 in place of refrigerant 63. After passing through heat exchanger 57, resultant vapor 28 and vapor 51 may be compressed in compressor 58 thereby forming compressed gas 59. According to this embodiment, at least a portion of synthesis gas generator feedstock 26, which supplies a synthesis gas generator 80, is derived from at least a portion of compressed gas 59. The synthesis gas generator feedstock 26 comprises at least a portion of the methane from compressed gas 59. Optionally, as shown in FIG. 5, fuel 52 may be taken from compressed gas 59. This fuel may be used for fuel uses in the liquefied natural gas plant or synthesis gas plant such as for gas turbine fuel requirements, steam methane reformer fuel requirements, combined-cycle turbine fuel, or furnace fuel such as for heaters attendant to a hydrocracking facility for processing Fischer Tropsch GTL products. Fuel 52 may also be used for public utility gas, supplying fuel to local cities, towns, or villages.

The present invention is described in further detail in connection with the following examples, it being understood that the examples are for purposes of illustration and not limitation.

EXAMPLES

An embodiment of the present invention was simulated by computational means. A natural gas feed is fed to a combined process for producing crude helium, synthesis gas generator feedstock, and a liquefied natural gas product in accordance with an embodiment of the present invention substantially as illustrated in FIG. 4. The simulation is based on a basis 10000 kg/hr of natural gas provided as feed 1. The process conditions and mass balance for key fluids of this embodiment are set out in Table 1 below. In Table 1, the concentration is listed as 0 mole % if the concentration is less than 0.001%.

TABLE 1

| | Fluid number | | | | | |
|---|---|---|---|---|---|---|
| | 7 | 10 | 19 | 29 | 39 | 42 |
| Phase | Liquid | Mixed | Liquid | Liquid | Liquid | Vapor |
| Temperature (° C.) | −131.7 | −133.2 | −133.2 | −147.2 | −158.9 | −133.2 |
| Pressure (MPa) | 1.12 | 0.76 | 0.76 | 0.31 | 0.12 | 0.76 |
| Total Flow (kg/h) | 10000 | 10000 | 9838 | 8671 | 7905 | 162 |
| Composition (mole %) | | | | | | |
| Helium | 0.042 | 0.042 | 0.005 | 0.000 | 0.000 | 2.389 |
| Nitrogen | 2.095 | 2.095 | 1.894 | 0.781 | 0.273 | 14.783 |
| Methane | 95.410 | 95.410 | 95.610 | 96.400 | 96.640 | 82.806 |
| Ethane | 1.599 | 1.599 | 1.624 | 1.835 | 2.012 | 0.021 |
| Propane | 0.532 | 0.532 | 0.541 | 0.611 | 0.670 | 0.000 |
| Isobutane | 0.110 | 0.110 | 0.112 | 0.126 | 0.138 | 0.000 |
| Butane | 0.179 | 0.179 | 0.182 | 0.205 | 0.225 | 0.000 |
| Isopentane | 0.017 | 0.017 | 0.017 | 0.019 | 0.021 | 0.000 |
| Pentane | 0.009 | 0.009 | 0.010 | 0.011 | 0.012 | 0.000 |
| Hexane | 0.004 | 0.004 | 0.004 | 0.004 | 0.005 | 0.000 |
| Heptane | 0.004 | 0.004 | 0.004 | 0.004 | 0.005 | 0.000 |

| | Fluid number | | | | | |
|---|---|---|---|---|---|---|
| | 27 | 37 | 44 | 46 | 48 | 59 |
| Phase | Vapor | Vapor | Mixed | Liquid | Vapor | Vapor |
| Temperature (° C.) | −147.2 | −159.4 | −169.3 | −169.3 | −169.3 | 37.8 |
| Pressure (MPa) | 0.31 | 0.12 | 0.72 | 0.72 | 0.72 | 3.31 |
| Total Flow (kg/h) | 1166 | 767 | 162 | 158 | 4 | 2092 |
| Composition (mole %) | | | | | | |
| Helium | 0.046 | 0.000 | 2.390 | 0.036 | 63.350 | 0.028 |
| Nitrogen | 10.445 | 6.033 | 14.743 | 14.199 | 29.930 | 9.062 |

TABLE 1-continued

| Methane | 89.499 | 93.963 | 82.845 | 85.742 | 6.720 | 90.901 |
|---|---|---|---|---|---|---|
| Ethane | 0.010 | 0.004 | 0.021 | 0.022 | 0.000 | 0.009 |
| Propane | 0.000 | 0.000 | 0.000 | 0.000 | 0.000 | 0.000 |
| Isobutane | 0.000 | 0.000 | 0.000 | 0.000 | 0.000 | 0.000 |
| Butane | 0.000 | 0.000 | 0.000 | 0.000 | 0.000 | 0.000 |
| Isopentane | 0.000 | 0.000 | 0.000 | 0.000 | 0.000 | 0.000 |
| Pentane | 0.000 | 0.000 | 0.000 | 0.000 | 0.000 | 0.000 |
| Hexane | 0.000 | 0.000 | 0.000 | 0.000 | 0.000 | 0.000 |
| Heptane | 0.000 | 0.000 | 0.000 | 0.000 | 0.000 | 0.000 |

The temperature of the cooled natural gas fluid 7 is about −131.7° C., which is much higher than the typical temperature of about −151.1° C. for processes producing only liquefied natural gas without the synthesis gas generator feedstock.

In this simulation, liquid 39, which feeds liquefied natural gas product 24, is about 79% of the feed 1. Vapor 48, which feeds crude helium 12, is about 0.04% of the feed 1. The balance supplies compressed gas 59, which feeds synthesis gas generator feedstock 26 and fuel 52.

According to the simulation, vapor 48, which feeds crude helium 12, is about 63.35 mole % helium and about 86.4% of the helium in cooled natural gas fluid 7 is recovered in vapor 48.

Nitrogen concentrates in the compressed gas 59, which feeds synthesis gas generator feedstock 26, having a concentration of about 9 mole %, whereas the nitrogen concentration in liquid 39, which feeds liquefied natural gas product 24, is about 0.3 mole %.

Figure 6:
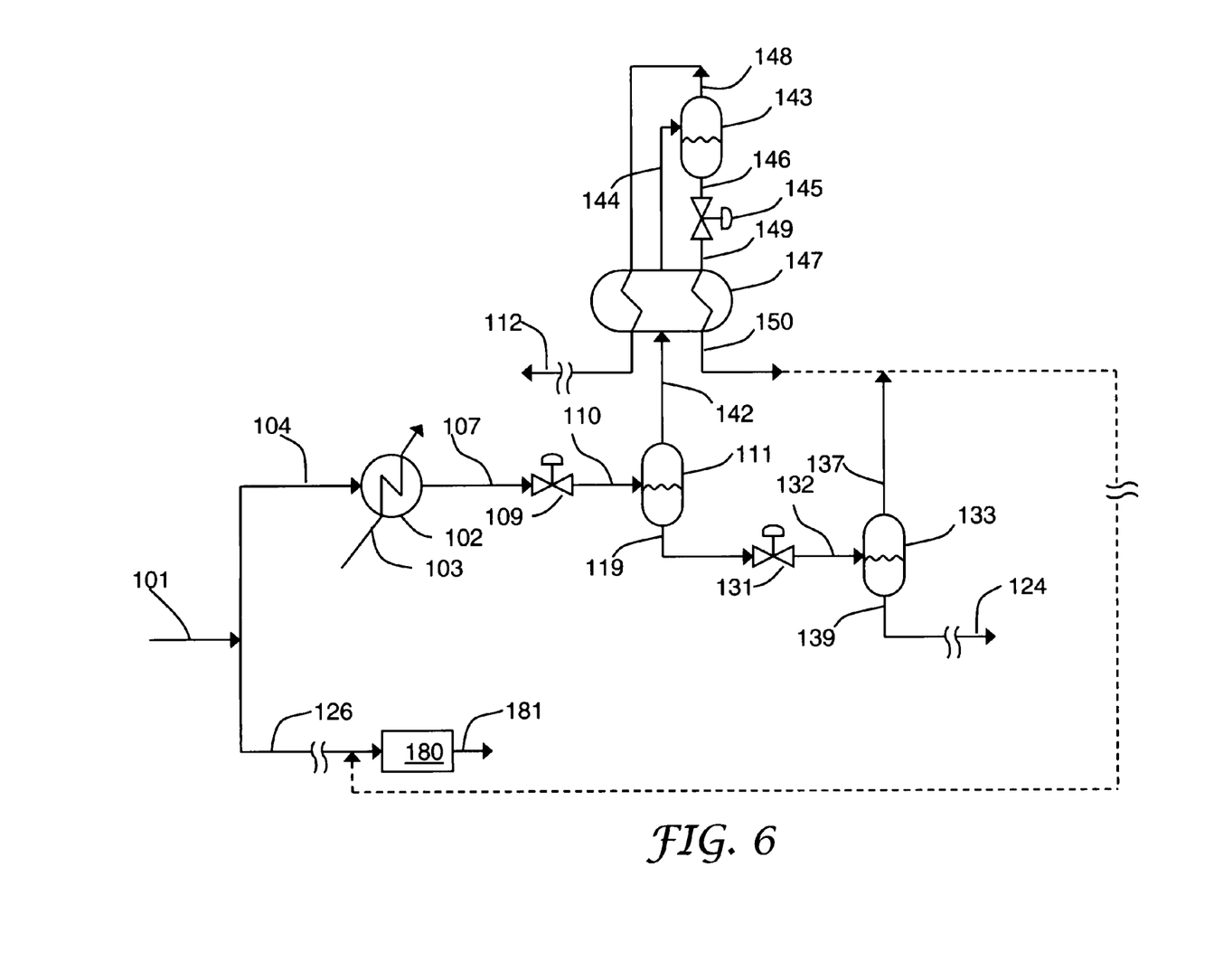
FIG. 6 is a schematic diagram of a process and apparatus for producing products from natural gas.

For comparison, a process in accordance with the configuration set forth in FIG. 6 was simulated. The simulation is based on a basis 10000 kg/hr of natural gas provided as feed 101. Feed 101 is split to provide natural gas feed 104 for an liquefied natural gas process and a separate synthesis gas generator feedstock 126. Helium is recovered only from the liquefied natural gas feed. The process conditions and mass balance for key fluids of this embodiment are set out in Table 2 below. In Table 2, the concentration is listed as 0 mole % if the concentration is less than 0.001%.

TABLE 2

| | Fluid number | | | | | | |
|---|---|---|---|---|---|---|---|
| | 101 | 107 | 110 | 119 | 137 | 139 | 142 |
| Phase | Vapor | Liquid | Mixed | Liquid | Vapor | Liquid | Vapor |
| Temperature (° C.) | 22.0 | −151.1 | −151.1 | −151.1 | −161.0 | −161.0 | −151.1 |
| Pressure (MPa) | 5.86 | 1.10 | 0.33 | 0.33 | 0.12 | 0.12 | 0.33 |
| Total Flow (kg/h) | 10000 | 8619 | 8619 | 8594 | 695 | 7899 | 26 |
| Composition (mole %) | | | | | | | |
| Helium | 0.042 | 0.042 | 0.042 | 0.006 | 0.073 | 0.000 | 12.700 |
| Nitrogen | 2.095 | 2.095 | 2.095 | 2.035 | 16.920 | 0.825 | 22.460 |
| Methane | 95.410 | 95.410 | 95.410 | 95.500 | 83.010 | 96.510 | 64.840 |
| Ethane | 1.599 | 1.599 | 1.599 | 1.604 | 0.003 | 1.734 | 0.005 |
| Propane | 0.532 | 0.532 | 0.532 | 0.534 | 0.000 | 0.577 | 0.000 |
| Isobutane | 0.110 | 0.110 | 0.110 | 0.110 | 0.000 | 0.119 | 0.000 |
| Butane | 0.179 | 0.179 | 0.179 | 0.179 | 0.000 | 0.194 | 0.000 |
| Isopentane | 0.017 | 0.017 | 0.017 | 0.017 | 0.000 | 0.018 | 0.000 |
| Pentane | 0.009 | 0.009 | 0.009 | 0.010 | 0.000 | 0.010 | 0.000 |
| Hexane | 0.004 | 0.004 | 0.004 | 0.004 | 0.000 | 0.004 | 0.000 |
| Heptane | 0.004 | 0.004 | 0.004 | 0.004 | 0.000 | 0.004 | 0.000 |

| | Fluid number | | | | | |
|---|---|---|---|---|---|---|
| | 144 | 146 | 148 | 104 | 126 | 150 |
| Phase | Mixed | Liquid | Vapor | Vapor | Vapor | Vapor |
| Temperature (° C.) | −176.1 | −176.1 | −176.1 | 22.0 | 22.0 | −153.5 |
| Pressure (MPa) | 0.30 | 0.30 | 0.30 | 5.86 | 5.86 | 0.12 |
| Total Flow (kg/h) | 26 | 19 | 6 | 8619 | 1381 | 19 |
| Composition (mole %) | | | | | | |
| Helium | 12.700 | 0.007 | 46.380 | 0.042 | 0.042 | 0.007 |
| Nitrogen | 22.460 | 13.670 | 45.800 | 2.095 | 2.095 | 13.670 |
| Methane | 64.840 | 86.320 | 7.817 | 95.410 | 95.410 | 86.320 |
| Ethane | 0.005 | 0.007 | 0.000 | 1.599 | 1.599 | 0.007 |
| Propane | 0.000 | 0.000 | 0.000 | 0.532 | 0.532 | 0.000 |
| Isobutane | 0.000 | 0.000 | 0.000 | 0.110 | 0.110 | 0.000 |
| Butane | 0.000 | 0.000 | 0.000 | 0.179 | 0.179 | 0.000 |
| Isopentane | 0.000 | 0.000 | 0.000 | 0.017 | 0.017 | 0.000 |
| Pentane | 0.000 | 0.000 | 0.000 | 0.009 | 0.009 | 0.000 |
| Hexane | 0.000 | 0.000 | 0.000 | 0.004 | 0.004 | 0.000 |
| Heptane | 0.000 | 0.000 | 0.000 | 0.004 | 0.004 | 0.000 |

As shown in FIG. 6, natural gas feed 104 is fed to heat exchanger 102 and cooled by cooling fluid(s) 103 thereby producing a cooled natural gas fluid 107. Cooled natural gas fluid 107 is expanded across pressure reduction means 109 so as to lower the pressure of the natural gas fluid 107 and autorefrigerate the natural gas to a lower temperature natural gas fluid 110.

Natural gas fluid 110 is directed to a separation device 111 for separating the vapor from the liquid. The vapor, which is enriched in helium, is removed as vapor 142 and the liquid, which comprises methane, is removed as liquid 119.

Liquid 119 is expanded across pressure reduction means 131 so as to lower the pressure of the liquid 119 and autorefrigerate the fluid to a lower temperature fluid 132 and thereby generating a vapor and a liquid. Lower temperature fluid 132 from the pressure reduction step is directed to a separation device 133 for separating the vapor from the liquid. The vapor, which comprises methane, is removed as vapor 137 and the liquid, which comprises methane, is removed as liquid 139. Liquid 139 supplies the liquefied natural gas product 124.

Vapor 142 is cooled in heat exchanger 147 thereby condensing at least a portion of the methane and thereby producing multiphase fluid 144 having a vapor component and a liquid component. Multiphase fluid 144 is directed to a separation device 143 for separating the vapor from the liquid. The vapor, which comprises a higher concentration of helium than the liquid, is removed as the vapor 148 and the liquid, which comprises methane, is removed as liquid 146. Crude helium 112 is derived from vapor 148.

As shown in FIG. 6, vapor 148 is returned to the heat exchanger 147 to be vaporized, thereby providing additional cooling for vapor 142. Liquid 146 is expanded across pressure reduction means 145 thereby forming a lower pressure fluid 149 and subsequently returned to heat exchanger 147 to also provide cooling for vapor 142.

Both simulations were constructed so that 79% by mass of the entering feed gas produces liquefied natural gas product.

The temperature of the cooled natural gas fluid 107 is about −151.1° C., which is typical for processes producing liquefied natural gas without producing a synthesis gas generator feedstock. Because of the additional subcooling for the configuration of FIG. 6 compared to FIG. 4, the liquefaction power for the configuration of FIG. 4 is calculated to be about 14% less.

According to the simulation, vapor 148, from which crude helium 112 is derived, is about 46.38 mole % helium and about 75.0% by mass of the helium in feed 101 is recovered in the vapor 148. This compares to 63.35 mole % helium and 86.4% by mass helium recovery for the process in FIG. 4. An even greater benefit will arise when a greater percentage of natural gas is fed to the synthesis gas generator feedstock.

The nitrogen contained in the liquefied natural gas product is less for the configuration of FIG. 4 as compared to the configuration of FIG. 6. The nitrogen contained in the liquefied natural gas product is calculated to be about 0.27 mole % and 0.83 mole %, for the configurations of FIG. 4 and FIG. 6, respectively.

Other embodiments and benefits of the invention will be apparent to those skilled in the art from a consideration of this specification or from practice of the invention disclosed herein. It is intended that this specification be considered as exemplary only with the true scope and spirit of the invention being indicated by the following claims.

We claim:

1. A process for producing products from natural gas comprising:
    cooling a pressurized natural gas feed comprising helium in an amount of less than 0.5 volume % and methane to produce a liquefied first fluid;
    reducing the pressure of at least a portion of the first fluid to produce a reduced pressure first fluid and separating the reduced pressure first fluid into a first vapor comprising helium and methane and a first liquid comprising methane in a molar ratio of first vapor to first liquid of 0.0001 to 0.04;
    deriving at least a portion of a crude helium from at least a portion of the first vapor;
    reducing the pressure of at least a portion of the first liquid to produce a reduced pressure fluid and separating said reduced pressure fluid into a second vapor comprising methane and a second liquid comprising methane;
    reacting at least a portion of the methane from the second vapor to produce at least a portion of a synthesis gas; and
    deriving at least a portion of a liquefied natural gas product from at least a portion of the second liquid.

2. The process of claim 1 wherein the pressure of the second liquid is less than 0.152 MPa.

3. The process of claim 1 further comprising:
    reducing the pressure of at least a portion of the second liquid to provide a reduced pressure second fluid and separating the reduced pressure second fluid into a third vapor comprising methane and a third liquid comprising methane; and
    deriving at least a portion of the liquefied natural gas product from at least a portion of the third liquid;
    wherein the pressure of the second liquid is greater than 0.152 MPa and the pressure of the third liquid is less than 0.152 MPa.

4. The process of claim 3 further comprising reacting at least a portion of the methane from the third vapor to produce at least a portion of the synthesis gas.

5. The process of claim 3 further comprising deriving public utility gas from at least a portion of at least one of the second vapor and the third vapor.

6. The process of claim 1 further comprising:
    condensing at least a portion of the first vapor thereby forming a first multiphase fluid comprising helium and methane;
    separating at least a portion of the first multiphase fluid into a fourth vapor comprising at least 40 volume % helium and a fourth liquid comprising methane; and
    deriving at least a portion of the crude helium from at least a portion of the fourth vapor.

7. The process of claim 6 further comprising reacting at least a portion of the methane from the fourth liquid to produce at least a portion of the synthesis gas.

8. The process of claim 6 wherein the step of condensing comprises passing at least a portion of the fourth vapor in heat exchange communication with at least a portion of the first vapor.

9. The process of claim 6 further comprising expanding at least a portion of the fourth liquid thereby forming a lower pressure fluid and wherein the step of condensing comprises passing at least a portion of the lower pressure fluid in heat exchange communication with at least a portion of the first vapor.

10. The process of claim 1 wherein the molar ratio of the first vapor to the first liquid is 0.001 to 0.03.

11. The process of claim 1 wherein the temperature of the first fluid is greater than −140° C.

12. The process of claim 1 wherein the temperature of the first fluid is greater than −135° C.

13. A process for producing products from natural gas comprising:
cooling a pressurized natural gas feed comprising helium in an amount of less than 0.5 volume % and methane to produce a liquefied first fluid comprising helium and methane from at least a portion of the natural gas;
reducing the pressure of at least a portion of the helium and methane from the first fluid to produce a reduced pressure first fluid and separating the reduced pressure first fluid into a first vapor comprising helium and methane, and a first liquid comprising methane, wherein the molar ratio of the first vapor to the first liquid is 0.001 to 0.03;
deriving at least a portion of a crude helium from at least a portion of the first vapor;
reducing the pressure of at least a portion of the methane from the first liquid to produce a reduced pressure fluid and separating said reduced pressure fluid into a second vapor comprising methane, and a second liquid comprising methane, said second liquid having a pressure greater than 0.1516 MPa;
reducing the pressure of at least a portion of the methane from the second liquid to produce a reduced pressure fluid and separating said reduced pressure fluid into a third vapor comprising methane and a third liquid comprising methane, said third liquid having a pressure less than 0.1516 MPa;
deriving at least a portion of a liquefied natural gas product from at least a portion of the third liquid; and
reacting at least a portion of the methane from at least one of the second vapor and the third vapor to produce at least a portion of a synthesis gas.

14. The process of claim 13 further comprising:
condensing at least a portion of the methane from the first vapor thereby forming a first multiphase fluid comprising helium and methane;
separating at least a portion of the helium and methane from the first multiphase fluid into a fourth vapor comprising at least 40 volume % helium and a fourth liquid comprising methane; and
deriving at least a portion of the crude helium from at least a portion of the fourth vapor.

15. An apparatus for producing products from natural gas comprising:
a first heat exchanger for at least partially liquefying pressurized natural gas comprising helium in an amount of less than 0.5 volume % and methane to produce a liquefied first fluid, said first heat exchanger having an inlet and an outlet;
a first pressure reducer having an inlet in fluid communication with the outlet of the first heat exchanger and an outlet;
a first separation device having an inlet in fluid communication with the outlet of the first pressure reducer, a vapor outlet for discharging a first vapor comprising helium and a liquid outlet for discharging a first liquid comprising methane;
a second pressure reducer having an inlet in fluid communication with the liquid outlet of the first separation device and an outlet;
a second separation device having an inlet in fluid communication with the outlet of the second pressure reducer, a vapor outlet for discharging a second vapor comprising methane and a liquid outlet for discharging a second liquid comprising methane;
a liquefied natural gas storage vessel having a first inlet in fluid communication with the liquid outlet of the second separation device;
a second heat exchanger for forming a first multiphase fluid having an inlet in fluid communication with the vapor outlet of the first separation device, and an outlet;
a third separation device having an inlet in fluid communication with the outlet of the second heat exchanger, a vapor outlet for discharging a crude helium vapor, and a liquid outlet for discharging a third liquid; and
a synthesis gas generator having an inlet in fluid communication with methane from at least one of the vapor outlet of the second separation device and the liquid outlet of the third separation device.

16. The apparatus of claim 15 further comprising:
a third pressure reducer having an inlet in fluid communication with the liquid outlet of the second separation device and an outlet; and
a fourth separation device having an inlet in fluid communication with the outlet of the third pressure reducer, a vapor outlet for discharging a third vapor, and a liquid outlet for discharging a fourth liquid, said liquid outlet for discharging the fourth liquid in fluid communication with the first inlet or a second inlet of said liquefied natural gas storage vessel.

17. The apparatus of claim 16 wherein said vapor outlet for discharging the third vapor is in fluid communication with the inlet of said synthesis gas generator.

18. The apparatus of claim 15 further comprising a helium purifying device having an inlet in fluid communication with the vapor outlet for discharging the crude helium vapor.

* * * * *